2,776,221

DRY TALL OIL ROSIN SIZE COMPOSITIONS

Edward Strazdins and Randall Hastings, Stamford, Conn., assignors to American Cyanamid Company, New York, N. Y., a corporation of Maine No Drawing. Application June 3, 1953,
Serial No. 359,433

8 Claims. (Cl. 106—218)

The present invention relates to stabilized dry disproportionated tall oil rosin sizes useful in the manufacture of sized paper. More particularly, the present invention relates to dry, free-flowing, homogeneous, water-dispersible sizes of improved resistance to oxidation consisting essentially of a neutral alkali metal salt of stabilized partially disproportionated tall oil rosin and a minor proportion of a neutral alkali metal salt of maleated rosin.

It is known that dry tall oil rosin size oxidizes rapidly on contact with air. When the size is finely divided, as is the case when the size is dried or drum-dried, the rate of oxidation is frequently so great as to cause the size to undergo spontaneous combustion on storage. While tall oil rosin dry size may be shipped with safety in airtight rubber plastic bags, it has been found a practical necessity to pretreat tall oil rosin to improve its oxygen resistance to avoid the need for air-tight bags which otherwise would be necessary.

Tall oil rosin is an article of commerce, for which definite standards have been set by the United States Department of Agriculture. It is the rosin remaining after the removal of fatty acids from tall oil by fractional distillation. Because the original resins of the pine wood have been extracted by the paper pulp digestor liquor and by subsequent refining, tall oil rosin is substantially free from the gums and resins which act as antioxidants for gum and wood rosins. It has a specific rotation of about zero, plus or minus a few degrees.

It is known that fully disproportionated tall oil rosin, that is, tall oil rosin which has been heated to above 250° C. until substantially all of the abietic acid content of the rosin has been converted to compounds free from conjugated double bonds, is very resistant to oxidation. The resulting rosin has a specific rotation of about $+55°$. Such rosin, however, when saponified, is of much decreased effectiveness as a sizing agent for paper.

It is also known that disproportionation increases the resistance of tall oil rosin to oxidation and also that rosin partially disproportionated to a specific rotation of about $+25°$ to $+45°$, when saponified, gives substantially unimpaired results as a sizing agent for paper. The oxidation resistance thus imparted, however, does not meet commercial standards, and before such rosin can be shipped and stored with safety a substantial amount of antioxidant must be added to prevent spontaneous combustion.

As the result of many trials in the past it has been found that when tall oil rosin is partially disproportionated to a specific rotation between about $+25°$ and $+45°$ and made into a dry size, the best inherent combination of oxygen resistance and sizing efficiency is obtained. It has further been found that commercially satisfactory stabilization of such rosin against spontaneous combustion is effected by the presence of 0.1% to 1% of any one of the known rosin size antioxidants. The dry size thus prepared, herein referred to as "stabilized partially disproportionated tall oil rosin dry size" has substantially the sizing efficiency and the same resistance to oxidation as dry size made from ordinary gum or wood rosin.

It is also known that ordinary rosin such as gum rosin, wood rosin, or tall oil rosin can be reacted with maleic anhydride to form Diels-Alder adducts hereinafter termed "maleated rosin." Such maleated rosin of commercial grade containing a small amount of unreacted rosin, when made into dry size is about as resistant to oxidation as dry size made from the partially disproportionated rosin described above containing an optimum amount of phenothiazine. When made into dry size, however, maleated rosin is a poor sizing agent for paper compared with the rosin from which it prepared.

It has now been discovered that dry sizes consisting essentially of a major proportion of partially disproportionated tall oil rosin, a minor amount of maleated rosin, and 0.1% to 1% of a rosin size antioxidant based on the weight of unmaleated rosin present have unexpectedly greater resistance to oxidation than corresponding sizes containing no maleated rosin.

It has been discovered that stabilized partially disproportionated tall oil rosin dry size and maleated rosin dry size exert on each other a mutual stabilizing or antioxidant effect, the resistance to oxidation of the two materials in combination being greater, and under preferred conditions very much greater, than the resistance to oxidation of either of the two materials alone. This is most surprising, as one would expect the resistance to oxidation of the combination to be the weighted average of the resistance to oxidation of the two dry sizes taken separately.

More in detail, the sizes of the present invention consist essentially of first, one part by weight of a substantially neutral alkali metal salt of partially disproportionated tall oil rosin. The best combination of sizing results and resistance to oxidation are obtained when the rosin has been disproportionated to a specific rotation of about $+35°$.

Secondly, the sizes of the present invention contain about ½ to ¼ part by weight of maleated rosin based on the weight of the partially disproportionated tall oil rosin, this range including the proportions where the components act as mutual antioxidants.

Maleated rosin is formed by the reaction of 1 mol of ordinary rosin including gum rosin, wood rosin and tall oil rosin with about 1 mol of maleic acid or anhydride. In commercial practice about 0.8 to 0.9 mol of maleic anhydride is used per mol of rosin in order to insure substantially complete reaction of the latter more valuable constituent. Thus maleated rosin usually contains a small proportion of unreacted rosin. Up to 50% of the maleic anhydride (molar basis) may be replaced by fumaric acid and by itaconic, citraconic, and aconitic acids and their anhydrides. Best resistance to oxidation is obtained in combination with best sizing results when the weight of maleated rosin size in the composition is about ⅓ of the weight of the partially disproportionated rosin, the benefits falling off on either side of this range.

When the proportion of maleated rosin in the composition is greater than about ½ the weight of the tall oil rosin size, sizing results fall below the values obtained by the use of the disproportionated rosin alone. On the other hand, when less than about ¼ part of maleated rosin is present, the increase in oxygen resistance disappears.

The partially disproportionated rosin and the maleated rosin are present in the form of their substantially neutral alkali metal salts such as the sodium or potassium salts. When the rosins are less than about 90% neutralized they are difficult to drum-dry and are less resistant to oxidation on storage.

Thirdly, the compositions of the present invention include an effective amount of a rosin size antioxidant for the unmaleated rosin present. A wide variety of such antioxidants is known. The antioxidants may be any of the secondary diarylamines and related compounds described in Dreshfield U. S. Patent No. 2,294,723 including diphenylamine and phenyl-2-naphthylamine; phenothiazine as described in Barthel et al. U. S. Patent No. 2,471,714; and nitrosodiphenylamine, di-tert-butyl-paracresol and the like. Such materials are normally effective in amounts varying from about 0.1% to 1% of the weight of the rosin. In practice, the diarylamines and phenothiazine both yield excellent results, the latter compound being preferred because of its thermal stability, its freedom from color, and its lack of skin toxicity.

The present invention has several important advantages. Its principal advantage is that it permits the production of dry tall oil rosin size of greater oxygen resistance than has previously been made possible by partial disproportionation and the addition of an antioxidant. As a result, the sizes of the present invention may be safely stored without danger of spontaneous combustion under more adverse conditions than has heretofore been considered safe. They deteriorate to a much decreased extent on normal storage.

Then the present invention permits a decrease in the amount of disproportionation of antioxidant required for the production of dry sizes to meet established specifications prescribing standards for oxygen resistance and sizing effectiveness.

Finally the product is used by the paper manufacturer in the same manner as ordinary dry rosin size making it unnecessary for the paper manufacturer to alter established procedures or learn new techniques.

The dry sizes of the present invention are made in each instance by forming a homogeneous aqueous solution comprising 1 part by weight of a substantially neutral alkali metal salt of the partially disproportionated rosin, ½ to ¼ part by weight of a substantially neutral alkali metal salt of a maleated rosin, and an effective amount of a rosin size antioxidant for the unmaleated rosin present, followed by drying the solution.

The solution may be dried in any manner so as to provide a dry size in free-flowing particulate form, and thus the product may consist of small spheres, flakes, or irregular particles. We prefer to dry the solution on a drum dryer heated by steam at 70 to 90 lbs. pressure, the product being a free-flowing powder of irregularly shaped particles. The particles contain the components of the liquid size in homogeneous intimate admixture.

The homogeneous aqueous solution referred to may be prepared in a variety of ways. According to one method, tall oil rosin is partially disproportionated in any convenient manner as by heating at 300° C. in the presence of a disproportionation catalyst, until the specific rotation (cube method) of a sample is about +35°. In a separate operation gum, wood, or tall oil rosin is heated at 160° C.–200° C. with maleic anhydride for 2 hours at the higher temperature or 7 hours at the lower temperature to form the Diels-Alder rosin-maleic adduct. The adduct and the disproportionated rosin are then saponified. They may be mixed before saponification or they may be saponified separately and the resulting solutions combined.

According to another method tall oil rosin is partially disproportionated by heating at 300° C. in the presence of a non-metallic catalyst such as about 2% of sulfur and then cooled to about 140° C. Maleic anhydride is then added and the mixture heated at 160°–200° C. until substantially all of the maleic anhydride has reacted to form the adduct.

The antioxidant is added at any point in the preparation where the nature of the antioxidant permits. Thus phenothiazine may be added to the tall oil rosin before disproportionation, this material not being harmed by the temperatures attained. Antioxidants which deteriorate on severe heating with rosin are most advantageously added during the saponification step.

Various methods may also be employed for the saponification. Thus the maleated rosin and the disproportionated rosin may be saponified separately in predetermined amounts and the resulting solutions mixed. Alternatively one of the two rosins may be saponified in a solution containing the theoretical amount of caustic required for the saponification of both rosins, and the remaining rosin may be added to and saponified in the solution thus formed. The amount of water used to form the caustic solution is predetermined to provide a saponified product containing roughly 70% solids. In each instance the amount of alkali employed is substantially that indicated by the acid numbers of the disproportionated rosin and the maleated rosin.

The particular methods employed for preparing the above described materials and solutions play no part in the present invention.

The following example is a specific embodiment of the present invention. The invention has been disclosed above and the example is an illustration and not a limitation thereof. Parts are by weight unless otherwise stated.

*Example 1*

*Size A.*—190 parts of tall oil rosin having a specific rotation of $[\alpha]_D + 32°$, which had been partially disproportionated by heating at 300° C. under carbon dioxide for 30 minutes in the presence of 2.5% sodium sulfite and 0.25% phenothiazine, were cooked with 19 parts of NaOH in 93 parts of water at 95° C. for 1½ hours to form a liquid size containing about 70% solids.

A sample of the liquid size thus prepared was dried on a laboratory drum drier heated with 70 lb. of steam to yield dry stabilized disproportionated rosin size in the form of a free-flowing coarse powder.

*Size B.*—A maleated rosin was prepared by heating 302 g. of gum rosin (1 mol) and 88 g. (0.8 mol) of maleic anhydride at 200° C. for 90 minutes. The product was cooked for two hours in an autoclave at 160° C. with 107 gm. of sodium hydroxide in 450 ml. of water to form a neutral liquid size containing 50% solids. A sample was drum dried in the same manner.

*Size C.*—A solution was made by mixing liquid size A with liquid size B in 3:1 weight ratio (solids basis). The mixture was drum dried in the same manner.

*Test method.*—The sizes were tested by two standard laboratory methods as follows.

*Manometric method.*—A 1.7 g. sample of the size is placed in a sealed glass flask of about 50 cc. volume provided with gas inlet and outlet tubes and evacuated at 120° C. and 5 mm. pressure for 1 hour. The sample is then swept with pure oxygen at atmospheric pressure. The flask is then connected to a manometer and maintained at 120° C. under oxygen at atmospheric pressure for 170 minutes, the oxygen consumption of the sample being expressed in centimeters by measuring the linear movement of the mercury column of the manometer. With the apparatus used, a dry size of satisfactory stability will consume less than 7 cm. of oxygen in 170 minutes while untreated tall oil rosin size will consume about 20 cm. of oxygen in 20 minutes, and very much more in 170 minutes.

*Smoldering test.*—A 2″ thick layer of the size is placed in a glass beaker in a vented oven heated at 150° C. and the time is noted for the sample to start to smolder. This method simulates in an accelerated manner the actual oxidation of rosin size in storage.

Results are as follows:

| Size | Test | | Smoldering, minutes |
|---|---|---|---|
| | Manometric | | |
| | Cm., O₂ | Time, minutes | |
| A. Stabilized partially disproportionated tall oil rosin dry size | 4 | 170 | 150 |
| B. Maleated gum rosin dry size | 14 | 170 | 150 |
| C. Blend of Size A+Size B | 1 | 170 | 300 |

These tests demonstrate that the blend of the two sizes possessed much greater resistance to oxidation than either of the two sizes taken alone, showing that the components of the size mutually stabilize each other.

*Example 2*

The effectiveness of dry sizes A, B, and C of Example 1 in the manufacture of paper was determined by dissolving in each case the dry size in water to a solids content of 5%, adding the resulting solutions to a stock of bleached 60% sulfite-40% soda pulp at 0.6% consistency, in the amount of 2% of sizing solids on the dry weight of the pulp, precipitating the size with 2% alum on the dry weight of the pulp, sheeting the fibers on a British handsheet machine and drying the paper thus formed. A control experiment was run in the same manner using an equal amount of dry tall oil rosin size which had not been disproportionated and which contained no antioxidant. The sheets were tested for their water absorption by the total immersion method (15 minutes at 73° F.). Results are as follows.

| Size | Water Absorption, Percent of Dry Weight of Paper |
|---|---|
| A | 38 |
| B | 45 |
| C | 35 |
| Control | 37 |

It will be seen from the table that even though the maleated rosin dry size (size B) gives inferior results when employed alone superior results are obtained when this size is used in combination with the disproportionated tall oil rosin size, and that the combination yields better results than the control.

We claim:

1. A storage-stable dry tall oil rosin size in homogeneous free-flowing particulate form consisting essentially of 1 part of a substantially neutral alkali metal salt of partially disproportionated tall oil rosin having a specific rotation between about +25° and +45°, ½ to ¼ part by weight of a substantially neutral alkali metal salt of a maleated rosin, and about 0.1% to 1% of a nitrogen-containing rosin size antioxidant selected from the group consisting of diarylamines and phenothiazines based on the weight of unmaleated rosin present.

2. A storage-stable dry tall oil rosin size in homogeneous free-flowing particulate form consisting essentially of 1 part by weight of a substantially neutral sodium salt of partially disproportionated rosin having a specific rotation between about +25° and +45°, about ½ to ¼ part by weight of a substantially neutral sodium salt of a maleated gum rosin, and 0.1% to 1% of a nitrogen-containing rosin size antioxidant selected from the group consisting of diarylamines and phenothiazines based on the weight of unmaleated rosin present.

3. A storage-stable dry tall oil rosin size in homogeneous free-flowing particulate form consisting essentially of 1 part by weight of a substantially neutral alkali metal salt of partially disproportionated tall oil rosin having a specific rotation between +25° and +45°, ½ to ¼ part by weight of a substantially neutral alkali metal salt of maleated partially disproportionated tall oil rosin having a specific rotation between about +25° and +45° and 0.1% to 1% of a nitrogen-containing rosin size antioxidant selected from the group consisting of diarylamines and phenothiazines based on the weight of unmaleated rosin present.

4. A storage-stable dry tall oil rosin size in homogeneous free-flowing particulate form consisting essentially of 1 part by weight of a substantially neutral sodium salt of partially disproportionated tall oil rosin having a specific rotation of about +35°, about ⅓ part by weight of a neutral sodium salt of maleated rosin, and 0.1% to 1% of a diarylamine rosin antioxidant.

5. A storage-stable dry tall oil rosin size in homogeneous free-flowing particulate form consisting essentially of 1 part by weight of a neutral sodium salt of partially disproportionated tall oil rosin having a specific rotation between about +25° and +45°, about ⅓ part by weight of a neutral sodium salt of maleated rosin, and 0.1% to 1% of phenothiazine.

6. A storage-stable dry tall oil rosin size in homogeneous free-flowing particulate form consisting essentially of 1 part by weight of a substantially neutral sodium salt of partially disproportionated tall oil rosin having a specific rotation of about +35°, about ⅓ part by weight of a neutral sodium salt of maleated gum rosin, and 0.1% to 1% of a nitrogen-containing rosin size antioxidant selected from the group consisting of diarylamines and phenothiazines.

7. A composition according to claim 6 wherein the antioxidant is a diarylamine.

8. A composition according to claim 6 wherein the antioxidant is phenothiazine.

References Cited in the file of this patent

UNITED STATES PATENTS

| | | |
|---|---|---|
| 2,249,766 | Humphrey | July 22, 1941 |
| 2,294,724 | Dreshfield | Sept. 1, 1942 |
| 2,311,386 | Hasselstrom | Feb. 16, 1943 |
| 2,322,197 | Oswald | June 15, 1943 |
| 2,471,714 | Barthel et al. | May 31, 1949 |
| 2,680,694 | Barthel et al. | June 8, 1954 |
| 2,684,300 | Wilson et al. | July 20, 1954 |